United States Patent
Patton (10) Patent No.: US 9,572,236 B2
(45) Date of Patent: Feb. 14, 2017

(54) SYSTEMS AND METHODS FOR CONTROLLING A PLURALITY OF ELECTRIC CANDLES

(71) Applicant: Luminara Worldwide, LLC, Eden Prairie, MN (US)

(72) Inventor: Douglas Patton, Irvine, CA (US)

(73) Assignee: Luminara Worldwide, LLC, Eden Prairie, MN (US)

( * ) Notice: Subject to any disclaimer, the term of this patent is extended or adjusted under 35 U.S.C. 154(b) by 0 days.

(21) Appl. No.: 14/764,916

(22) PCT Filed: Jan. 29, 2014

(86) PCT No.: PCT/US2014/013665
§ 371 (c)(1),
(2) Date: Jul. 30, 2015

(87) PCT Pub. No.: WO2014/120818
PCT Pub. Date: Aug. 7, 2014

(65) Prior Publication Data
US 2015/0373815 A1  Dec. 24, 2015

Related U.S. Application Data

(60) Provisional application No. 61/758,602, filed on Jan. 30, 2013.

(51) Int. Cl.
*H05B 33/08* (2006.01)
*F21S 6/00* (2006.01)
(Continued)

(52) U.S. Cl.
CPC ......... *H05B 37/0272* (2013.01); *F21S 10/043* (2013.01); *F21S 10/046* (2013.01);
(Continued)

(58) Field of Classification Search
None
See application file for complete search history.

(56) References Cited

U.S. PATENT DOCUMENTS

| | | | |
|---|---|---|---|
| 5,747,940 | A | 5/1998 | Openiano |
| 5,924,784 | A | 7/1999 | Chliwnyj et al. |

(Continued)

FOREIGN PATENT DOCUMENTS

| | | |
|---|---|---|
| CA | 2314163 | 6/1999 |
| CN | 201093299 | 7/2008 |

(Continued)

OTHER PUBLICATIONS

Patent Cooperation Treaty "Notification of Transmittal of International Preliminary Report on Patentability", PCT/US14/13665, May 28, 2015.

*Primary Examiner* — Douglas W Owens
*Assistant Examiner* — Dedei K Hammond
(74) *Attorney, Agent, or Firm* — Fish & Tsang LLP (57) ABSTRACT

Systems and methods are described for controlling a plurality of electric lighting devices and in some embodiments preventing the theft of those devices. A microprocessor can be used to analyze information about the devices and send one or more commands to the devices. A user interface allows a user to send a command to at least one of the electric lighting devices, which may alter at least one of a brightness of light emitted, a color of light emitted or other effects of the devices.

19 Claims, 5 Drawing Sheets

(51) Int. Cl.
*F21S 10/04* (2006.01)
*H05B 37/02* (2006.01)
*F21V 33/00* (2006.01)
*F21V 11/18* (2006.01)
*F21V 23/04* (2006.01)
*F21V 5/00* (2015.01)
*F21V 23/00* (2015.01)
*H04N 9/31* (2006.01)
*F21V 17/02* (2006.01)
*F21V 17/10* (2006.01)
*F21V 31/00* (2006.01)
*F21Y 113/00* (2016.01)
*F21W 121/00* (2006.01)

(52) U.S. Cl.
CPC .............. *F21V 5/007* (2013.01); *F21V 11/18* (2013.01); *F21V 17/02* (2013.01); *F21V 17/10* (2013.01); *F21V 23/003* (2013.01); *F21V 23/0442* (2013.01); *F21V 31/00* (2013.01); *F21V 33/0028* (2013.01); *F21V 33/0052* (2013.01); *H04N 9/31* (2013.01); *F21V 23/0464* (2013.01); *F21V 23/0471* (2013.01); *F21W 2121/00* (2013.01); *F21Y 2113/00* (2013.01); *F21Y 2113/10* (2016.08)

(56) References Cited

U.S. PATENT DOCUMENTS

| | | |
|---|---|---|
| 7,159,994 B2 | 1/2007 | Schnuckle et al. |
| 7,261,455 B2 | 8/2007 | Schnuckle |
| 7,350,720 B2 | 4/2008 | Jaworski |
| 7,481,571 B2 | 1/2009 | Bistritzky et al. |
| 7,503,668 B2 | 3/2009 | Porchia et al. |
| 7,550,935 B2 | 6/2009 | Lys et al. |
| 7,677,753 B1 | 3/2010 | Wills |
| 7,686,471 B2 | 3/2010 | Reichow |
| 7,824,627 B2 | 11/2010 | Michaels et al. |
| 7,837,355 B2 | 11/2010 | Schnuckle |
| 8,070,319 B2 | 12/2011 | Schnuckle et al. |
| 8,132,936 B2 | 3/2012 | Patton et al. |
| 8,210,708 B2 | 7/2012 | Hau et al. |
| 8,256,935 B1 * | 9/2012 | Cullimore ............... F21S 6/001 362/276 |
| 8,342,712 B2 | 1/2013 | Patton et al. |
| 8,454,190 B2 | 6/2013 | Hau et al. |
| 8,534,869 B2 | 9/2013 | Patton et al. |
| 8,550,660 B2 | 10/2013 | Patton et al. |
| 8,646,946 B2 | 2/2014 | Schnuckle et al. |
| 8,696,166 B2 | 4/2014 | Patton et al. |
| 8,721,118 B2 | 5/2014 | Patton et al. |
| 8,727,569 B2 | 5/2014 | Schnuckle et al. |
| 8,789,986 B2 | 7/2014 | Li |
| 8,926,137 B2 | 1/2015 | Li |
| 2001/0033488 A1 | 10/2001 | Chliwnyj et al. |
| 2002/0048169 A1 | 4/2002 | Dowling et al. |
| 2004/0223326 A1 | 11/2004 | Wainwright |
| 2005/0002188 A1 | 1/2005 | Bucher et al. |
| 2005/0169666 A1 | 8/2005 | Porchia et al. |
| 2005/0285538 A1 | 12/2005 | Jaworski et al. |
| 2006/0034100 A1 * | 2/2006 | Schnuckle ............... B44C 5/06 362/161 |
| 2006/0039835 A1 | 2/2006 | Nottingham et al. |
| 2006/0125420 A1 | 6/2006 | Boone et al. |
| 2006/0146544 A1 * | 7/2006 | Leung ..................... F21S 6/001 362/392 |
| 2007/0127249 A1 | 6/2007 | Medley et al. |
| 2007/0177394 A1 | 8/2007 | Vock et al. |
| 2007/0189026 A1 | 8/2007 | Chemel et al. |
| 2008/0031784 A1 | 2/2008 | Bistritzky et al. |
| 2008/0038156 A1 | 2/2008 | Jaramillo |
| 2008/0112154 A1 * | 5/2008 | Reichow ................. F21S 10/04 362/96 |
| 2008/0117633 A1 | 5/2008 | Li |
| 2008/0130266 A1 | 6/2008 | DeWitt et al. |
| 2008/0150453 A1 | 6/2008 | Medley et al. |
| 2010/0025458 A1 | 2/2010 | Lederer |
| 2010/0124050 A1 | 5/2010 | Hau et al. |
| 2011/0027124 A1 | 2/2011 | Albee et al. |
| 2011/0127914 A1 | 6/2011 | Patton et al. |
| 2011/0134628 A1 | 6/2011 | Pestl et al. |
| 2012/0020052 A1 | 1/2012 | McCavit et al. |
| 2012/0024837 A1 | 2/2012 | Thompson |
| 2012/0093491 A1 | 4/2012 | Browder et al. |
| 2012/0116604 A1 | 5/2012 | Gookin |
| 2014/0292194 A1 * | 10/2014 | Sagal ................. H05B 37/0227 315/34 |

FOREIGN PATENT DOCUMENTS

| | | |
|---|---|---|
| DE | 4120849 | 1/1993 |
| EP | 1878449 A1 | 1/2008 |
| EP | 2172690 A2 | 4/2010 |
| EP | 2092797 | 11/2012 |
| EP | 2587127 | 5/2013 |
| WO | 2011112258 | 9/2011 |
| WO | 2013/020439 A1 | 2/2013 |

\* cited by examiner

SYSTEMS AND METHODS FOR CONTROLLING A PLURALITY OF ELECTRIC CANDLES

This application is a U.S. National Stage filing of PCT/US14/13665, filed Jan. 30, 2014, which claims the benefit of priority to U.S. provisional application having serial no. 61/758,602 filed on Jan. 30, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric lighting devices, and especially lighting devices configured to simulate a flickering flame.

BACKGROUND

The following background discussion includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., U.S. pat. publ. no. 2011/0127914 to Patton et al., U.S. Pat. No. 7,350,720 to Jaworski et al.; U.S. Pat. No. 7,686,471 to Reichow; U.S. pat. publ. no. 2005/0285538 to Jaworski et al. (publ. December 2005); U.S. Pat. No. 7,481,571 to Bistritzky et al.; U.S. pat. publ. no. 2008/0031784 to Bistritzky et al. (publ. February 2008); U.S. pat. publ. no. 2006/0125420 to Boone et al. (publ. June 2006); U.S. pat. publ. no. 2007/0127249 to Medley et al. (publ. June 2007); U.S. pat. publ. no. 2008/0150453 to Medley et al. (publ. June 2008); U.S. pat. publ. no. 2005/0169666 to Porchia, et al. (publ. August 2005); U.S. Pat. No. 7,503,668 to Porchia, et al.; U.S. Pat. No. 7,824,627 to Michaels, et al.; U.S. pat. publ. no. 2006/0039835 to Nottingham et al. (publ. February 2006); U.S. pat. publ. no. 2008/0038156 to Jaramillo (publ. February 2008); U.S. pat. publ. no. 2001/0033488 to Chliwnyj; U.S. pat. publ. no. 2008/0130266 to DeWitt et al. (publ. June 2008); U.S. pat. publ. no. 2012/0024837 to Thompson (publ. February 2012); U.S. pat. publ. no. 2011/0134628 to Pestl et al. (publ. June 2011); U.S. pat. publ. no. 2011/0027124 to Albee et al. (publ. February 2011); U.S. pat. publ. no. 2012/0020052 to McCavit et al. (publ. January 2012); U.S. pat. publ. no. 2012/0093491 to Browder et al. (publ. April 2012); and European publ. no. 1878449. However, while various embodiments of electric candles are known, such systems fail to provide the ability to control a plurality of electric candles.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved systems and methods that allow a user to control a plurality of electrical candles.

SUMMARY OF THE INVENTION

The inventive subject matter provides apparatus, systems and methods in which one can control a plurality of electric candles or other electric lighting devices. This advantageously allows a user to control multiple electric candles from a single location rather than require the user to approach each candle individually to turn it on or off, or vary its settings. Thus, the user can not only save the time that would otherwise be required, but the electric candles can be placed in locations that are less accessible but may heighten the ambiance of a room, for example, or provide necessary lighting. In addition, the user could create a program that allows for coordinated effects among the electric candles or other lighting devices. For example, the devices could be coordinated to change or accent certain colors at specific times relative to other candles in a room. In one example, the candles could thereby create a "wave" effect where the color change flows through the room over time. Thus, the lighting and other effects could be synchronized with each other.

Preferred systems include a control server configured to store at least one lighting control program, and could store a plurality of lighting programs that allow users to vary the operation of the electric candles as desired. It is further contemplated that users could modify the stored lighting programs, or create additional lighting programs for their specific needs.

A microprocessor can be coupled with the control server and configured to send command signals to a set of electric lighting devices based on at least one of the lighting control programs. It is further contemplated that commands could be sent to the lighting devices as a result of a user's input in a user interface, for example. Additionally, commands could be sent based on one or more external factors, such as a location of a lighting device, a level of ambient light, a level of ambient noise or an average level thereof, a position of a lighting device relative to other lighting devices, and so forth.

In some contemplated embodiments, a personal computer or portable computing device could comprise the microprocessor and control server. Thus, for example, a smart phone or tablet PC could be used with the system. Other devices include, for example, a desktop computer, a laptop computer, a smart watch, a home or business automation control panel, and so forth.

Preferably, the electric candles each have a projection screen coupled to a housing such that some or all of the projection screen extends from the housing. In some contemplated embodiments, the projection screen could move with respect to the housing, and in other contemplated embodiments, the projection screen could be affixed to the housing. Light can be projected onto an outer surface of the projection screen using one or more, and preferably at least two, light sources. It is especially preferred that the device can include three or more light sources that collectively emit light on to an outer surface of the projection screen.

Where the projection screen moves with respect to the housing, it is preferred that the electric candle include a drive mechanism configured to cause movement of the projection screen. In such embodiments, the electric candle can have a memory configured to store a preloaded waveform that controls operation of the drive mechanism. For example, where the drive mechanism is an electromagnet (e.g., a coil of wire and timer circuitry), the waveform can control the strength and duration of the electromagnetic field generated by the electromagnet and thereby control (at least somewhat) the movement of the projection screen.

It is contemplated that the lighting control program can modify or otherwise direct at least one of a brightness, a color of light, a sound output, and the preloaded waveform of the electric lighting device.

Contemplated systems could further include a user interface that allows a user to send a command to at least one of the electric lighting devices.

In other contemplated embodiments, methods for controlling a plurality of electric lighting devices can include the step of providing access to a control server configured to store a set of lighting control programs. Access could also be provided to a microprocessor coupled with the control server and a plurality of electric lighting devices.

The microprocessor can be used to determine and/or receive input regarding a parameter associated with each of the lighting devices, which could include a parameter associated with the device itself or an external parameter such as ambient light levels, noise levels, time of day, etc. The parameter(s) can be analyzed using the microprocessor and a command can be sent to one or more of the lighting devices that causes at least one of a brightness of light emitted by the one or more lighting devices, a color of light emitted by the one or more lighting devices, and the preloaded waveform stored in the one or more lighting devices to be modified.

In still other embodiments, methods for controlling a plurality of electric candles are contemplated that including the steps of providing access to a control server configured to store a set of template control programs, and providing access to a microprocessor coupled with the control server. Preferably, the microprocessor is also wirelessly coupled to a plurality of electric candles.

A user interface can be configured to allow a user to modify a control program of one or more of the electric candles, and cause the modified control program to be sent to one or more of the electric candles.

Systems for preventing theft of electric candles are also contemplated. Preferred systems include a plurality of electric candles disposed in a defined geographical area, which could be, for example, a restaurant, a hotel, or other business, a home, or other location. A candle monitoring device having a memory and a microprocessor can be configured to communicate wirelessly with the plurality of candles. Each of the electric candles is configured to shut down if placed outside of the defined geographical area Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while portions of the following description is drawn to a computer/server based lighting control system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
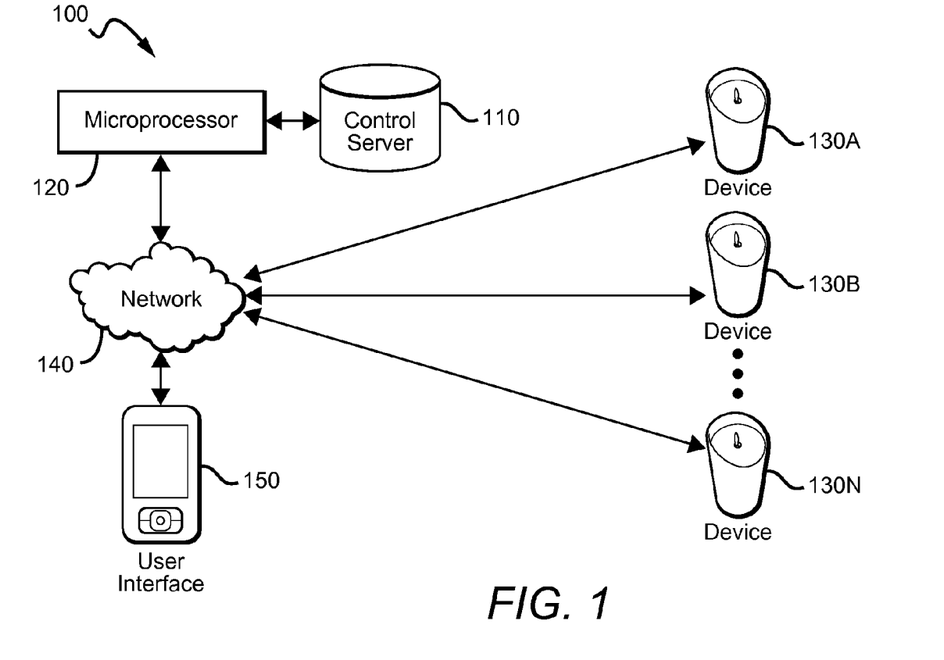
FIGS. 1-3 are diagrams of various embodiments of systems for controlling a plurality of electric lighting devices.

FIG. 1 illustrates one embodiment of a system 100 for controlling a plurality of electric lighting devices 130A-130N. System 100 includes a control server 110 that is configured to store one or more lighting control programs. A microprocessor 120 can be coupled with the control server 110 and configured to send command signals to a set of electric lighting devices 130A-130N as a function of at least one of the lighting control programs. Preferably, such commands are sent via network 140, which preferably is a wireless network although wired networks are also contemplated. Exemplary wireless networks include, for example, WIFI, Bluetooth, RF, Infrared, and other commercially suitable standards.

Figure 4:
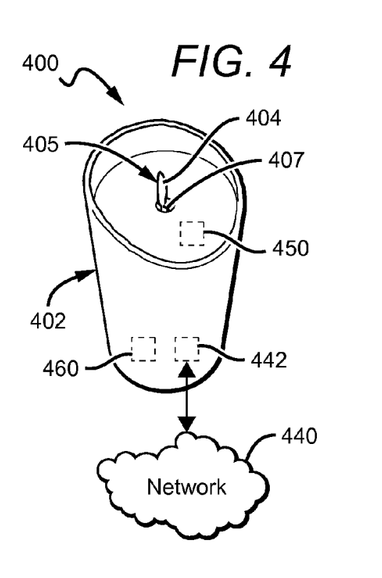
FIG. 4 is a side, perspective view of one embodiment of an electric lighting device.

Each of the lighting devices 130A-130N has a projection screen that preferably moves as a function of a preloaded waveform in the lighting device. Preferred devices resemble traditional wax candles, although other form factors such as a light bulb are also contemplated. It is especially preferred that the devices 130A-130N are configured to simulate a flickering flame effect and include a housing and a projection screen extending upwardly from the housing. The projection screen may have a tear-drop or other shape to simulate the look of a flame. Although the projection screen can be static with respect to the housing, it is preferred that the projection screen be coupled to the housing such that the projection screen can move using an electromagnet, a fan, or other mechanisms to move the projection screen. The projection screen may have one or more concavities. An exemplary lighting device is shown in FIG. 4 and described below.

Each of the electric lighting devices 130A-130N can include a network device that allows the devices 130A-130N to wirelessly receive signals from the microprocessor or other remote device.

It is contemplated that the lighting control programs can be programmed to modify at least one of a brightness of light emitted by a lighting device, a color of light emitted by the lighting device, a sound emitted, and the preloaded waveform stored in the lighting device.

System 100 can further include a user interface 150 that is configured to allow a user to send a command to at least one of the electric lighting devices 130A-130N. Although shown as a smart phone, the user interface 150 can be accessed via any computing device, which could include, for example, desktop computers, laptops, tablet PCs, smart watches, portable media players, computing glasses, home or business automation control panels, remotes, and so forth. Although the user interface 150 could comprise a website or computer software, it is especially preferred that the user interface comprise a software app such as for a smart phone. Exemplary interfaces are shown below in FIGS. 7-8. It is contemplated that the command could modify the preloaded waveform of the device. Other contemplated commands include turn on light, turn off light, turn on scent, turn off scent, change color of light emitted, change brightness of light emitted, change speed of projection screen movement, set timer for power on, turn on sound or music, and so forth.

Figure 2:
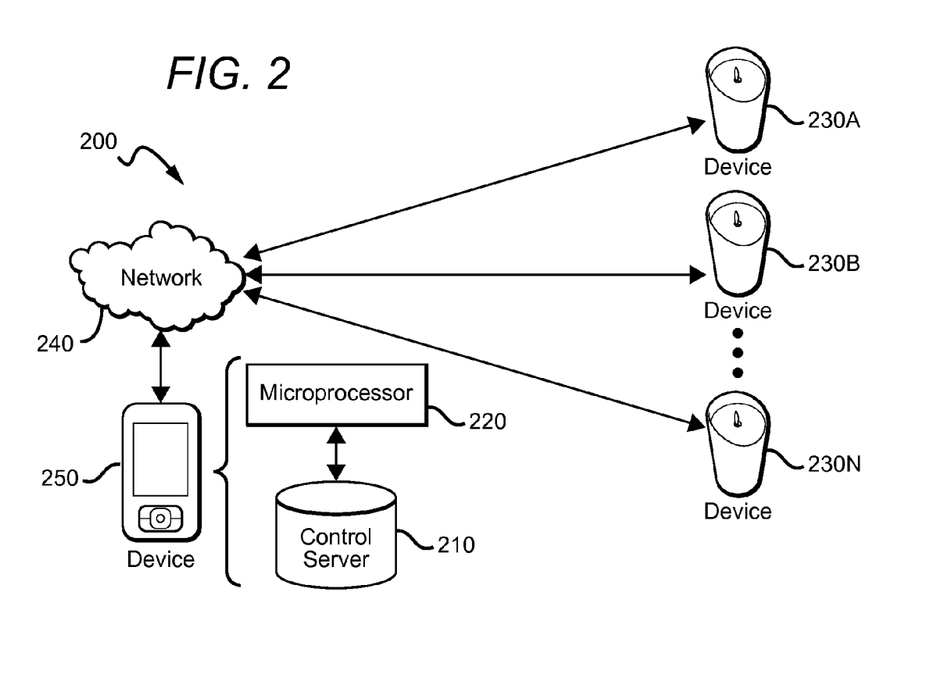

As shown in FIG. 1, the control server 110 and microprocessor 120 can be disposed remotely from the electric lighting devices 130A-130N. This could include in the same geographical area, or in a distinct geographical area. Where the control server 110 and microprocessor 120 are disposed in a smart phone or other portable computing device such as shown in FIG. 2, it is contemplated that the control server 110 and microprocessor 120 could be located anywhere and simply wirelessly connect to the electric lighting devices 130A-130N via network 140. Thus, for example, a user could control the electric lighting devices 130A-130N from practically anywhere in the world where a network connection exists.

In some contemplated embodiments, the microprocessor 120 can determine a parameter associated with one or more of the electric lighting devices 130A-130N. This could include, for example, receiving information regarding the parameter or deducing the parameter from other information. The information concerning the parameter can be analyzed using the microprocessor 120 and a command can be sent to the lighting device associated with the parameter or a neighboring device that modifies at least one of a brightness of light emitted by one or more of the lighting devices, a color of light emitted by the one or more of the lighting devices, and the preloaded waveform stored in the one or more of the lighting devices. Some contemplated parameters include, for example, a location of an electric lighting device, a distance of one lighting device from a second lighting device, a level of ambient light, a level or average level of ambient noise, a time of day, a day of the week, and so forth.

For example, the microprocessor 120 can determine or receive information regarding an approximate location of each of the electric lighting devices 130A-130N. One or more commands can be sent to some or all of the devices 130A-130N based at least in part on the approximate location of the device and/or neighboring devices. In this manner, for a building with multiple rooms and one or more lighting devices in each room, the microprocessor 120 could send different commands to the devices in one room than those commands sent to devices in a different room.

As just one example, the devices in one room could be instructed to reduce a brightness of the light emitted, while those devices in another room could have the brightness of light emitted increased. As another example, a lighting control program of one or more of the electric lighting devices 130A-130N could be modified as a function of the approximate location of the lighting devices. Such program may be modified if a change in location of a lighting device is detected, for example. The command sent could then include the modified lighting control program. The modified lighting control program could, for example, modify at least one of a brightness, a color of light, and the preloaded waveform of that lighting device as a function of its approximate location.

Alternatively or additionally, the microprocessor could determine or receive information regarding an approximate location of each of the lighting devices 130A-130N relative to the other lighting devices. One or more commands could then be sent to one or more of the devices 130A-130N based on a device's approximate location relative to the other devices. For example, where devices are grouped together in a single location, a user may wish to have the colors, brightness or other parameters of the lighting effects vary among the grouped devices. Thus, the system 100 could utilize the location information to modify a lighting control program of each of the grouped devices to ensure variation among the devices. This could include modifying the waveform that effects movement of the projection screen of each device to ensure that the group devices do not appear to have a synchronized effect.

The microprocessor could further include instructions that a lighting control program of a device be modified if the distance of the device from neighboring devices is less than a threshold distance. For example, the microprocessor could determine whether a lighting device is within a threshold distance from another lighting device, and modify the preloaded waveform of the adjacent lighting devices such that each of the adjacent lighting devices has a preloaded waveform that is different from the lighting device.

As another example, a level of ambient light about an electric lighting device could be determined, and a command could be sent to one or more of the lighting devices 130A-130N that modifies the brightness of light emitted by the one or more lighting devices if the level of ambient light is less than or greater than a threshold level. Thus, in a simple example, as the sun sets, the electric lighting devices could be commanded to increase their brightness.

FIG. 2 illustrates another embodiment of a system 200 for controlling a plurality of electric lighting devices 230A-230N, in which a microprocessor 220 and control server 210 are disposed within a portable computer device 250. Although a smart phone is shown, any computing device could be alternatively used including those described above. With respect to the remaining numerals in FIG. 2, the same considerations for like components with like numerals of FIG. 1 apply.

Figure 3:
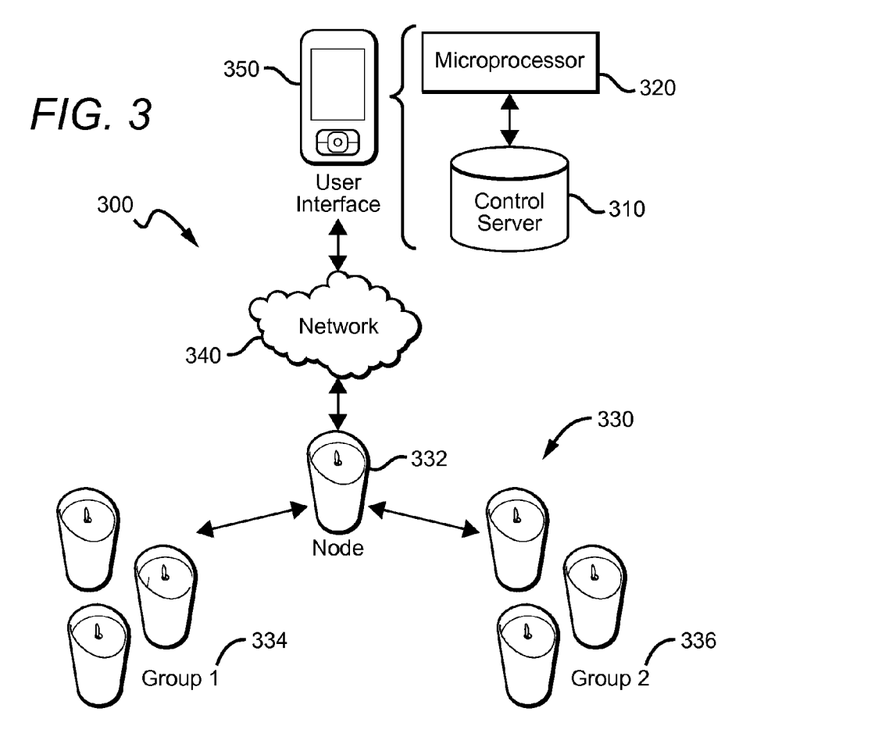

FIG. 3 illustrates another embodiment of a system 300 for controlling a plurality of electric lighting devices 330. At least one of the plurality of electric lighting devices 330 comprises a node 332 configured to receive one or more command signals via network 340 and propagate some or all of the command signals to other lighting devices 334 and 336. It is contemplated these commands signals could be modified as necessary before being propagated. A response signal could then be sent back via network 340 to confirm receipt of the signals. In such embodiments, it is contemplated that each of the lighting devices 330 can be wirelessly coupled to the other lighting devices. In one embodiment, each of the lighting devices 330 could be coupled via a wireless network, although in other embodiments, it is contemplated that neighboring lighting devices could be coupled via a first network (e.g., Bluetooth, RF, etc.), and that group of lighting devices could be coupled to the node 332 or microprocessor 320 via a second network (e.g., WIFI, Bluetooth, etc.).

FIG. 4 illustrates one embodiment of an electric lighting device 400 having an outer housing 402 configured to resemble a traditional wax candle, although other form factors such as a light bulb are also contemplated. The electric lighting device 400 has a projection screen 404 extending upwardly from the housing 402.

Projection screen 404 may resemble a flame and could include one or more concavities across its surface. The projection screen 404 may have a tear-drop or other shape to simulate the look of a flame. Although the projection screen 404 could be fixed with respect to the housing 402, it is preferred that the projection screen 404 be coupled to the housing 402 such that the projection screen 404 can move using an electromagnet, a fan, or other drive mechanism(s) to move the projection screen 404. In such embodiments, it is preferred that the device 400 include a member 405 in which the projection screen 404 comprises the upper portion of the member, and a lower portion 407 can be disposed within the housing 402. Where the projection screen 404 is static, it is contemplated that all or substantially all of the projection screen 404 will extend from the housing 402.

In some embodiments, the power to the drive mechanism(s) that cause movement of the projection screen 404, and member 405 where used, can be governed using one or more preloaded waveform(s) stored within the device 400. For example, where an electromagnet is used, the waveform can specify the parameters of the pulses of energy to the coil that creates the electromagnetic field used to cause movement of the projection screen 404. This could include, for example, the strength of a pulse, the duration of the pulse, the number of pulses in a specified time period, and the off time between adjacent pulses. It is further contemplated that the duration and/or strength of each pulse could vary or could be identical to the duration of preceding or subsequent pulses. Furthermore, the off time between pulses could be identical and/or there could be a more pronounced off time after a set number of pulses.

Device 400 could further include one or more scent cartridge that emits a pleasant odor, likely with the assistance of a fan. Where a scent cartridge is used, it is preferred that the device mechanism also comprises the fan, although the fan could be in addition to a separate drive mechanism such as an electromagnet or motor.

Device 400 can also include one or more light sources, each of which can emit light on to the projection screen 404 and preferably emits light on to an outer surface of the projection screen 404. Light sources are preferably disposed within the housing 402 such that the light sources emit light upwardly on to the projection screen 404. Where multiple light sources are used, it is especially preferred that each of the light sources emits light at a predominant wavelength that is different from the other light sources. Thus, for example, a first light source could emit visible light in the orange spectrum (e.g., a predominant wavelength of between 590-620 nm), a second light source could emit white light, and a third light source could emit visible light in the blue spectrum (e.g., a predominant wavelength of between 450-495 nm). In this manner, the visible lighting effect on the projection screen 404 can include an orange color around a periphery of the projection screen 404 with a blue color at its bottom.

Device 400 can further include a light controller adapted to modify parameters of the light sources over time. Such parameters could include, for example, a brightness of the light emitted by the light source, an on/off status of the light source, a color emitted by the light source, and so forth. Preferably, such modifications occur as a function of one or more waveforms. It is especially preferred that each of the light sources could have its own unique waveform that governs the behavior of the light source. Thus, while each of the light sources can be individually controlled, it is contemplated that the control can account for parameters of neighboring light sources and/or the movement or current position of the projection screen where the projection screen is non-stationary.

It is especially preferred that the light sources each emits light according to its own unique waveform that is distinct from, but congruent with, the waveforms of the other light sources. Thus, for example, a brightness of a first light source can be varied according to a first waveform that accounts for the relative brightness of adjacent light sources at each point in time. This allows the device 400 to produce a more realistic effect simulating a flickering flame, and ensures that the respective levels of light emitted from each light source collectively produces a realistic effect as the various lights may dim, change colors, and so forth. The light sources can thereby be dimmed in unison, or different colors of light could be accented at various times to reflect the ever-changing nature of a burning flame. A detailed discussion of prior knowledge of generating a flickering flame effect can be found in U.S. Pat. No. 8,070,319 to Schnuckle, et al.

Where local storage is required, it is contemplated that device 400 could include memory where one or more lighting programs, waveforms, or other information could be stored. Such information could be pre-programmed at the point of manufacture, or could be later downloaded into the device either via a wired or wireless connection. For a wireless connection, device 400 could include one or more wireless network devices 442. Where wireless connections are used, it is contemplated that the information could be distributed to a plurality of similar lighting devices simultaneously or near-simultaneously, such that the various devices follow a similar program. To avoid the appearance of each device creating an identical effect, a time delay could be utilized as a function of a device's location relative to a neighboring device. This can help ensure that adjacent devices have some differentiation apart from any chaotic movement created as a result of how the projection screen is mounted to the housing.

Device 400 could further a sensor 450 that is configured to detect a level of ambient light at device 400. Alternatively or additionally, device 400 could include a microphone to detect noise and/or a sensor that detects movement or a position of the projection screen 404. For example, the brightness of the light sources could be dimmed as the level of ambient light decreases. As another example, the colors and/or brightness of the light sources could be modified as movement of the projection screen 404 is detected.

To determine its location, device 400 could optionally include a GPS transponder 460, for example. With respect to the remaining numerals in FIG. 4, the same considerations for like components with like numerals of FIG. 1 apply.

Figure 5:
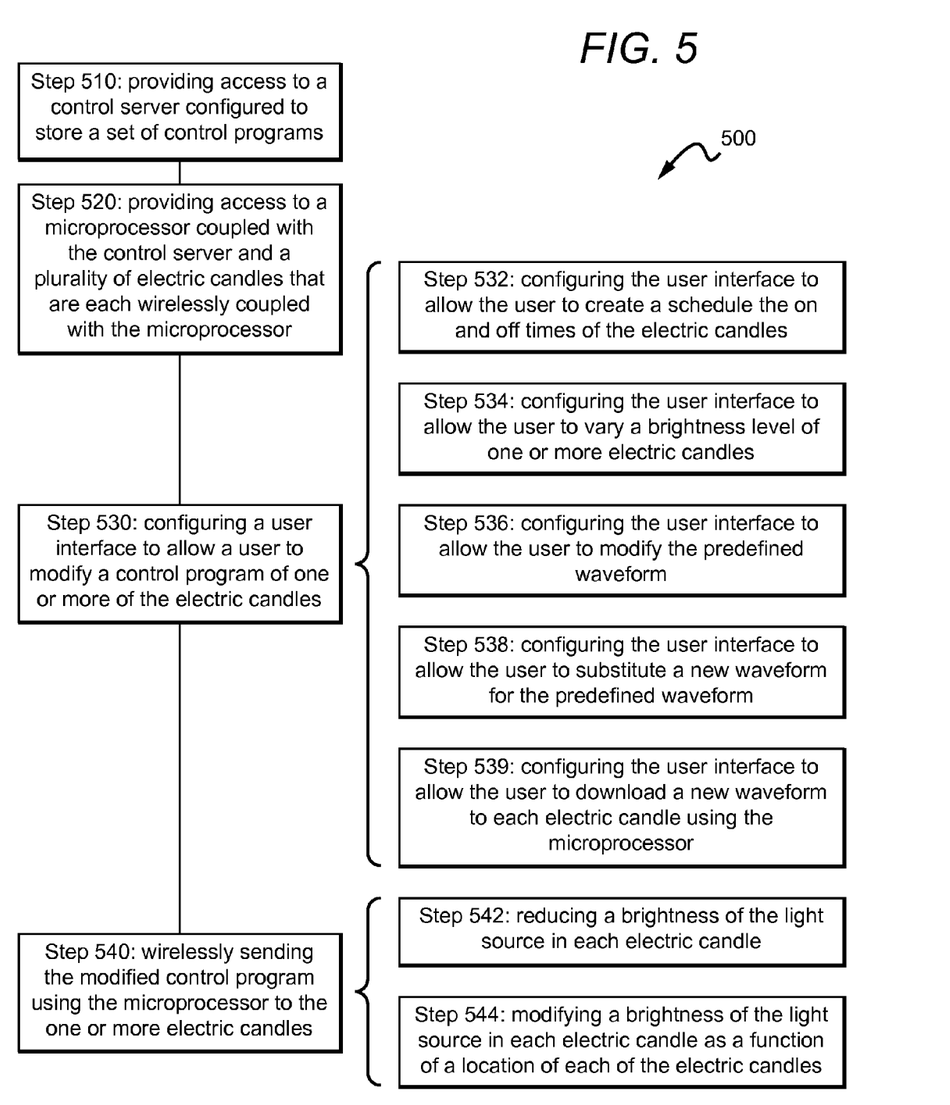
FIG. 5 is a diagram of one embodiment of a method for controlling a plurality of electric lighting devices.

FIG. 5 illustrates one embodiment of a method 500 for controlling a plurality of electric candles. Step 510 comprises providing access to a control server configured to store a set of control programs, which could regulate a light source, movement of the projection screen, a drive mechanism if present, and so forth.

In step 520, access can be provided to a microprocessor coupled with the control server and a plurality of electric candles, wherein each of the electric candles is wirelessly coupled with the microprocessor.

A user interface can be configured in step 530, such that a user can modify a control program of one or more of the electric candles. This could include for example, creating a schedule of the on and off times of some or all of the electric candles in step 532, varying a brightness level of some or all of the electric candles in step 534, modifying the predefined waveform of some or all of the electric candles in step 536, substituting a new waveform for the predefined waveform of some or all of the electric candles in step 538, and/or downloading a new waveform to some or all of the electric candles using the microprocessor in step 539.

This modified control program can be wirelessly sent to the one or more electric candles in step 540, which could result in a brightness of the light source in each of the electric candles being reduced in step 542 or reducing the brightness as a function of a location of each electric candle in step 544. The brightness level or other parameter of the electric candle could be reduced or changed if a level of ambient light is less than or greater than a threshold level.

Figure 6:
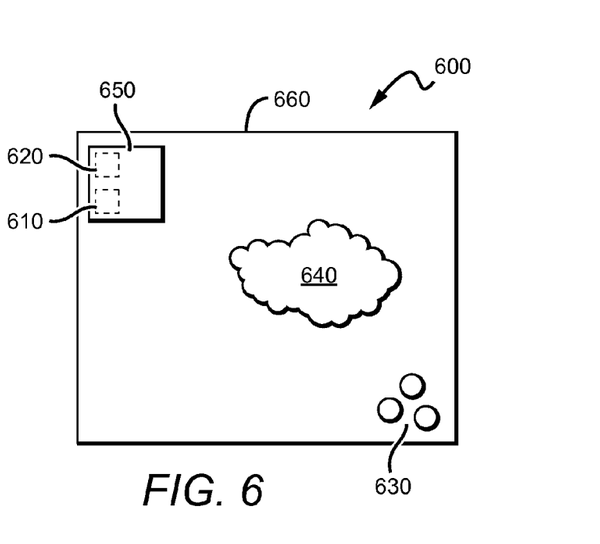
FIG. 6 is a diagram of one embodiment of a system for preventing theft of electric candles.

FIG. 6 illustrates one embodiment of a system 600 for preventing theft of electric candles. System 600 includes a plurality of electric candles 630 disposed in a defined geographical area 660. Preferably, each of the electric candles 630 is configured to shut down if placed outside of the defined geographical area 660. In some embodiments, the candles 630 can be configured to shut down immediately after being removed from the defined geographical area 660, while in other embodiments, the candles 630 can be configured to shut down after being removed from the defined geographical area 660 for a predefined time period.

A candle monitoring device 650 can include memory 610 and a processor 620 and may communicate wirelessly with the plurality of candles 630 either directly via network 640, for example, or indirectly.

As discussed above, each of the candles 630 could include a GPS transponder that provides location information of the candle. That information could be used by the candle itself to determine if it is outside the defined geographical area 660 such as by using a candle engine (processor) within the candle. The information could also or alternatively be transmitted to the monitoring device 650, for example, for reporting purposes or to elicit action when necessary. One action could be for the monitoring device to send a signal to the candle when it removed from the defined geographical area 660.

In other embodiments, the monitoring device 650 can periodically transmit a signal to the electric candles 630. In such embodiments, it is contemplated that if a candle does not receive the signal for longer than a predefined time period, the candle can be programmed to automatically shut down. In still another embodiment, the candle can be programmed to automatically shut down if it cannot connect to a defined wireless network for more than a predefined time period.

Figure 7:
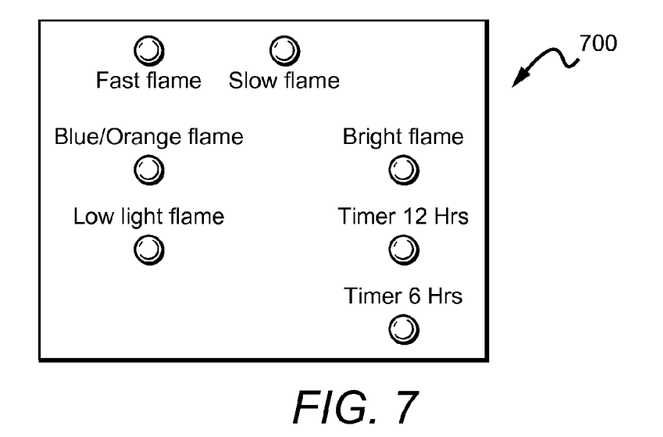
FIGS. 7-8 illustrate two embodiments of a user interface.

FIG. 7 illustrates one embodiment of a user interface 700 that can be used to modify one or more parameters of a single, or more preferably a plurality of, electric lighting devices. This could be viewed via a website or a software application. It could also be manufactured as a remote with set or variable options depending on the button actuated. As shown in FIG. 7, via the interface 700, the speed of the effect (e.g., flame movement), the color of the light, the brightness of the light, and timer functions could be modified using the controls shown.

It is contemplated that the candle itself could be programmed with a set of programs, each of which could vary a movement, color, intensity, duration, etc. of the flame effect in the electric lighting device. The interface 700 could then be used essentially to select the desired program preloaded on the device. Using such an interface, it is contemplated that the plurality of devices could be synchronized with the push of a button, or alternatively, be made asynchronous with neighboring devices where desired.

Figure 9:
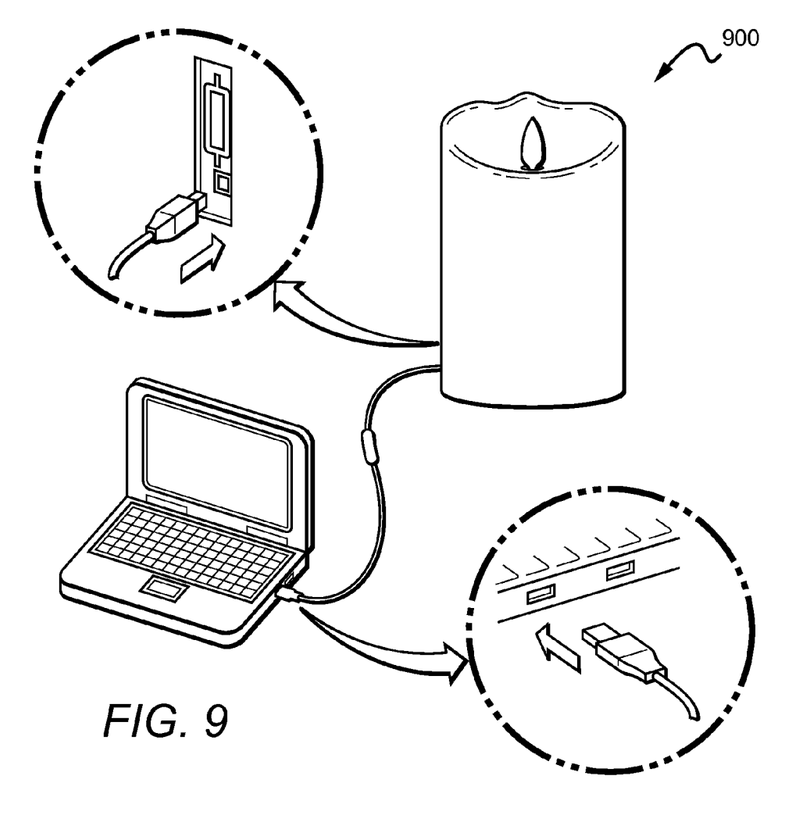
FIG. 9 illustrates another embodiment of an electric lighting device having a USB port.

In still further embodiments, the electric lighting device could include a USB or other connector port to allow the device to be programmed or information to be downloaded to the device such as shown in FIG. 9. In some embodiments, programming can occur when the devices are plugged into a central charging station that may accept a plurality of the devices simultaneously and thereby allow for simultaneous program of the devices. Such programming or other downloads could also occur wirelessly. In such embodiments, it is also contemplated that music, sound effects, or other media could be downloaded to the devices. Thus, for example, the device could be configured to store a plurality of songs of a user and thereby provide not only light but also background music. In other embodiments, the device could utilize one or more sound effects in conjunction with the flickering flame effect to simulate a condition, such as a windy night. In that example, the device could play a sound track of wind blowing and provide a flame effect that gives the appearance of a breeze hitting the flame.

Figure 8:
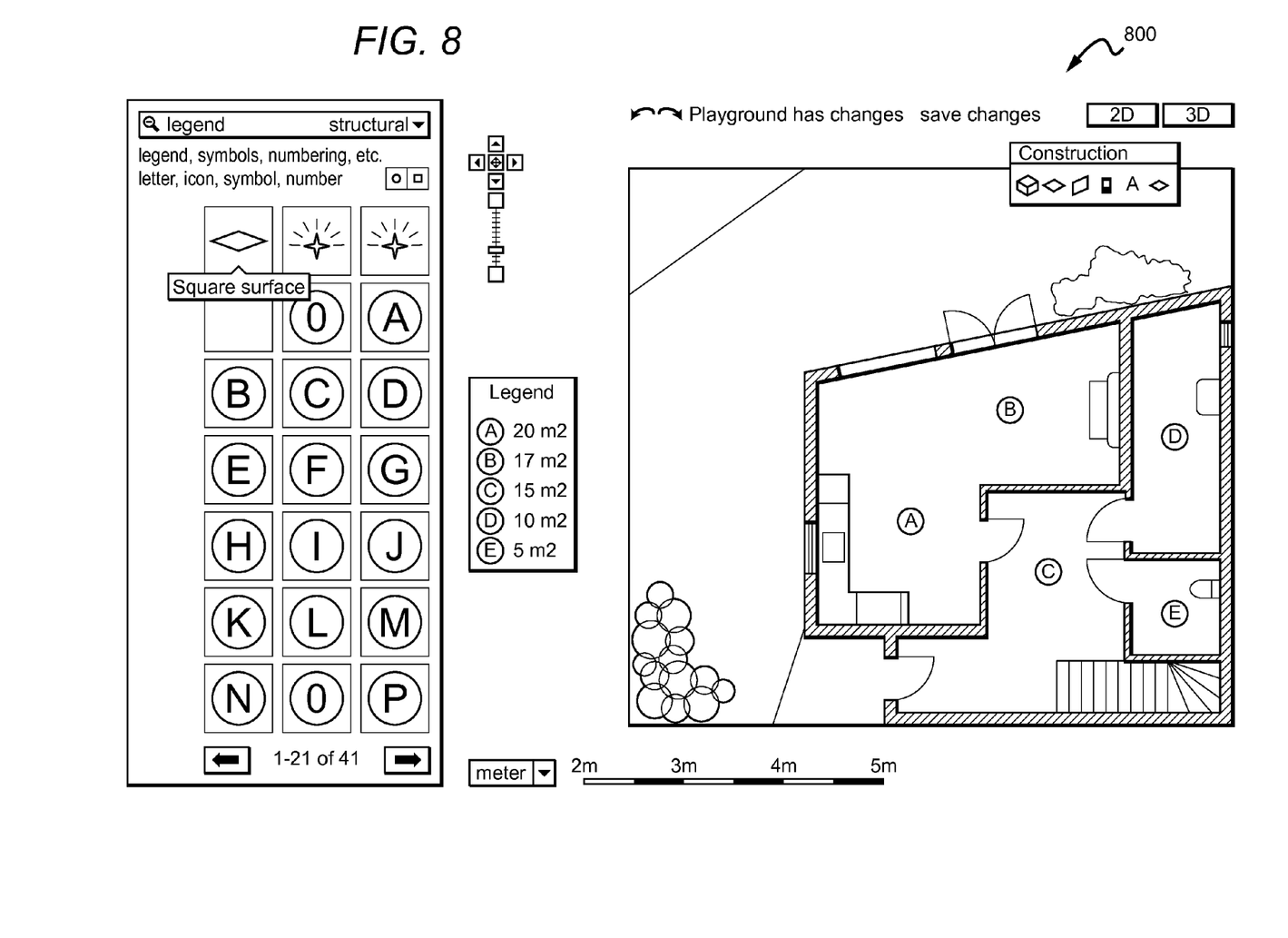

FIG. 8 illustrates another view of a user interface 800 that allows for control of the electric lighting devices by zones. This can be beneficial where the devices are disposed through a building, whether a residence, a business, a hotel, etc., and allows for a central control of a plurality of devices. Preferably, the devices are controlled via a wireless connection over which commands can be sent, although wired connections are also contemplated. Using such an interface, a group of devices in a zone could quickly be turned on or off, for example.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the"

includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A system for preventing theft of electric candles, comprising:
    a plurality of electric candles disposed in a defined geographical area;
    a candle monitoring device comprising a memory and a microprocessor, and configured to communicate wirelessly with the plurality of candles; and
    wherein each candle of the plurality of electric candles is configured to shut down if placed outside of the defined geographical area.

2. The system of claim 1, wherein each candle of the plurality of electric candles is further configured to shut down immediately after being removed from the defined geographical area.

3. The system of claim 1, wherein each candle of the plurality of electric candles comprises a GPS transponder that provides location information.

4. The system of claim 3, wherein the candle monitoring device periodically receives the location information of each candle of the plurality of electric candles.

5. The system of claim 1, wherein the candle monitoring device is further configured to periodically transmit a signal to each of the plurality of electric candles, and wherein each of the plurality of electric candles is configured to shut down when the signal is not received for more than a predefined time period.

6. A system for controlling a set of electric lighting devices, comprising:
    a microprocessor configured to send command signals to the set of electric lighting devices as a function of a lighting control program, wherein each lighting device of the set of lighting devices has a projection screen that moves as a function of a preloaded waveform; and
    a user interface configured to allow a user to send a command to at least one electric lighting devices of the set,
    wherein at least one lighting device of the set of lighting devices of the set comprises a node configured to receive the command signals and propagate one or more of the command signals to the other lighting devices of the set, and
    wherein the lighting control program is configured to modify at least one of a brightness, a color of light, and the preloaded waveform.

7. The system of claim 6, further comprising a control server configured to store an alternate lighting control program.

8. The system of claim 7, wherein the control server and the microprocessor are local to the set of lighting devices.

9. The system of claim 7, wherein the control server and the microprocessor are disposed remotely from the set of lighting devices.

10. The system of claim 7, wherein the node is further configured to propagate one or more of the command signals to a second set of lighting devices.

11. The system of claim 6, wherein the microprocessor is further configured to determine an approximate location of each lighting device of the set of lighting devices with respect to the other lighting devices and send a command signal based at least in part on the approximate location of each device relative to other lighting devices.

12. The system of claim 11, wherein the microprocessor is further configured to modify the lighting control program as a function of an approximate distance of a lighting device from adjacent lighting devices, and send the modified control program to the lighting device.

13. The system of claim 6, wherein each lighting device of the set of lighting devices comprises a GPS transponder.

14. The system of claim 6, wherein each lighting device of the set of lighting devices comprises a wireless network device configured to receive signals wirelessly from a remote device.

15. The system of claim 6, wherein each lighting device of the set of lighting devices comprises an electric candle.

16. A system for restricting use of electric lighting devices, comprising:

a plurality of electric lighting devices disposed in a defined geographical area;

a monitoring device comprising a memory and a microprocessor, and configured to periodically communicate with the plurality of lighting devices and transmit a signal to each of the plurality of lighting devices; and wherein each of the plurality of lighting devices is configured to shut down when the signal is not received for more than a predefined time period.

17. The system of claim 16, wherein each lighting device comprises a GPS transponder that provides location information, and wherein the monitoring device periodically receives the location information of each candle of the plurality of lighting devices.

18. The system of claim 16, wherein the monitoring device is disposed within a charging station, and wherein the monitoring device is further configured to transmit the signal to each of the plurality of lighting devices when the lighting devices are electrically coupled with the charging station.

19. The system of claim 16, wherein the predefined time period is 24 hours.

\* \* \* \* \*